(12) United States Patent
Hong et al.

(10) Patent No.: US 12,030,470 B2
(45) Date of Patent: Jul. 9, 2024

(54) HYDRAULIC PRESSURE SUPPLY DEVICE

(71) Applicant: HL MANDO CORPORATION, Pyeongtaek-si (KR)

(72) Inventors: Kwang Seok Hong, Seoul (KR); Jin Yeong Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 354 days.

(21) Appl. No.: 17/608,183

(22) PCT Filed: Apr. 29, 2020

(86) PCT No.: PCT/KR2020/005809
§ 371 (c)(1),
(2) Date: Nov. 2, 2021

(87) PCT Pub. No.: WO2020/222582
PCT Pub. Date: Nov. 5, 2020

(65) Prior Publication Data
US 2022/0203950 A1 Jun. 30, 2022

(30) Foreign Application Priority Data

May 2, 2019 (KR) .................. 10-2019-0051750

(51) Int. Cl.
*B60T 13/74* (2006.01)
*B60T 13/16* (2006.01)
(Continued)

(52) U.S. Cl.
CPC .......... *B60T 13/686* (2013.01); *B60T 13/168* (2013.01); *B60T 11/236* (2013.01); *B60T 13/745* (2013.01); *B60Y 2400/81* (2013.01)

(58) Field of Classification Search
CPC ...... B60T 13/745; B60T 8/368; B60T 8/4018; B60T 8/4022; B60T 8/4031;
(Continued)

(56) References Cited

U.S. PATENT DOCUMENTS 9,522,665 B2 * 12/2016 Choi ..................... B60T 8/4077
2012/0073286 A1 * 3/2012 Takayama ............. B60T 13/745
60/538
(Continued)

FOREIGN PATENT DOCUMENTS

JP 2006189071 A * 7/2006 ......... F16H 25/2454
JP 2023125633 A * 9/2023
(Continued)

OTHER PUBLICATIONS

Korean Office Action dated Sep. 19, 2023 for corresponding Korean Patent Application No. 10-2019-0051750, 10 pages, English Machine Translation.
(Continued)

*Primary Examiner* — Bradley T King
(74) *Attorney, Agent, or Firm* — Hauptman Ham, LLP (57) ABSTRACT

Disclosed herein a hydraulic supply apparatus includes a motor coupled to a modulator block including flow paths and valves for adjusting brake hydraulic pressure therein, the motor having a stator and a rotor; a sleeve coupled to the rotor to rotate together, and including an accommodating space inside and a first screw thread provided on an inner circumferential surface thereof; a screw shaft provided in the accommodating space, and including a second screw thread meshing with the first screw thread on an outer circumferential surface thereof to convert a rotational motion of the sleeve into a linear motion; and a piston connected to an end
(Continued)

of the screw shaft; wherein a central axis of the piston is arranged eccentrically with respect to a central axis of the screw shaft.

19 Claims, 8 Drawing Sheets

(51) Int. Cl.
  *B60T 13/68* (2006.01)
  *B60T 11/236* (2006.01)
(58) Field of Classification Search
  CPC .... B60T 13/168; B60T 13/686; B60T 11/236; F16D 2125/023; F16D 2125/40; B60Y 2400/81
  See application file for complete search history.

(56) References Cited

U.S. PATENT DOCUMENTS

| | | | | |
|---|---|---|---|---|
| 2013/0043718 | A1* | 2/2013 | Feigel | B60T 8/4845 303/14 |
| 2013/0133448 | A1 | 5/2013 | Schroeder et al. | |
| 2016/0221562 | A1* | 8/2016 | Leiber | B60T 8/4081 |
| 2016/0280196 | A1* | 9/2016 | Zhang | B60T 13/745 |
| 2017/0030445 | A1* | 2/2017 | Weh | F15B 15/14 |
| 2017/0341632 | A1* | 11/2017 | Han | F16H 19/04 |
| 2018/0001880 | A1* | 1/2018 | Huang | B60T 13/66 |
| 2018/0162330 | A1* | 6/2018 | Odaira | B60T 8/171 |
| 2018/0297571 | A1* | 10/2018 | Sprocq | F16H 25/20 |
| 2019/0084544 | A1 | 3/2019 | Severinsson et al. | |
| 2019/0100172 | A1* | 4/2019 | Lee | B60T 7/042 |
| 2020/0339088 | A1* | 10/2020 | Ninbari | F04B 19/04 |
| 2022/0234560 | A1* | 7/2022 | Weh | B60T 17/08 |

FOREIGN PATENT DOCUMENTS

| | | |
|---|---|---|
| KR | 10-2016-0001681 A | 1/2016 |
| KR | 10-2017-0093944 A | 8/2017 |
| KR | 10-2019-0037894 A | 4/2019 |

OTHER PUBLICATIONS

International Search Report issued on Aug. 28, 2020, corresponding to International Application No. PCT/KR2020/005809.
Written Opinion issued on Aug. 28, 2020, corresponding to International Patent Application No. PCT/KR2020/005809.

* cited by examiner

HYDRAULIC PRESSURE SUPPLY DEVICE

CROSS-REFERENCE TO RELATED APPLICATION

The present application is a national stage filing under 35 U.S.C § 371 of PCT application number PCT/KR2020/005809 filed on Apr. 29, 2020, which is based upon and claims the benefit of priorities to Korean Patent Application No. 10-2019-0051750 filed on May 2, 2019, in the Korean Intellectual Property Office. All of the aforementioned applications are hereby incorporated by reference in their entireties.

TECHNICAL FIELD

The disclosure relates to a hydraulic supply apparatus, and more particularly, to a hydraulic supply apparatus provided in an electronic brake system to generate hydraulic pressure.

BACKGROUND ART

In recent years, hybrid vehicles, fuel cell vehicles and electric vehicles, and the like have been actively developed to improve fuel efficiency and reduce exhaust emissions. Such a vehicle is essentially provided with a brake device, in other words, a brake device for a vehicle that reduces or stops the speed of a traveling vehicle.

A conventional vehicle brake device may include a vacuum brake that generates braking force by suction pressure of an engine, and a hydraulic brake that generates braking force by hydraulic pressure.

A vacuum brake refers to a device that uses the pressure difference between suction pressure of an engine and atmospheric pressure within a vacuum booster to exert a large braking force with a small force, which generates a greater output than the force applied to a brake pedal when a driver depresses the brake pedal.

In electronic brake systems, which is a type of hydraulic brake, when a driver depresses a brake pedal, an electronic control unit (ECU) detects it and operates hydraulic pressure generating device to generate hydraulic pressure, thereby performing braking. In other words, when the driver depresses the brake pedal, a pedal displacement sensor detects a displacement of the brake pedal, and a hydraulic supply device operates in response to a signal from the ECU, thereby braking wheel cylinders.

Such an electronic brake system includes a hydraulic supply device that outputs the operation of a brake pedal as an electrical signal through a pedal displacement sensor to operate a motor, and converts a rotational force of the motor into a linear motion to generate braking hydraulic pressure, a hydraulic block in which a plurality of valves are installed to control a braking operation by receiving hydraulic pressure with the force generated by the hydraulic supply device, a pedal simulator providing a reaction force to the brake pedal, and an ECU for controlling the motor and the valves.

Meanwhile, a conventional hydraulic supply device includes a pinion gear rotated by a motor, and a rack gear that linearly moves in a state engaged with the pinion gear. In other words, the hydraulic supply device is installed such that the pinion gear is engaged with the corresponding surface of the rack gear, so that the rack gear is linearly moved.

However, the hydraulic supply device having the above described configuration is driven in a rack-and-pinion manner to generate braking pressure. The rack-and-pinion manner increases the size of a rack gear driving portion and also excessively increase the weight thereof, resulting in decreased mountability in the vehicle and a lay-out design.

DISCLOSURE

Technical Problem

The disclosure is directed to provide a hydraulic supply apparatus capable of improving assembly and productivity.

Further, the disclosure is directed to provide a hydraulic supply apparatus capable of simplifying a structure and lightening a weight.

Further, the disclosure is directed to provide a hydraulic supply apparatus capable of preventing a piston used in a ball-screw manner from rotating during operation.

Further, the disclosure is directed to provide a hydraulic supply apparatus capable of preventing a damage to parts even when a load greater than an allowable value is applied.

Further, the disclosure is directed to provide a hydraulic supply apparatus capable of reducing the number of parts to low a cost, and being advantageous for packaging by improving space utilization.

Technical Solution

In accordance with an aspect of the disclosure, a hydraulic supply apparatus includes a motor coupled to a modulator block including flow paths and valves for adjusting brake hydraulic pressure therein, the motor having a stator and a rotor; a piston configured to move forward and backward in a hydraulic chamber to provide hydraulic pressure; and a drivetrain configured to convert a rotational motion of the motor into a linear motion to apply and release the pressure of the piston; wherein a central axis of the drivetrain is arranged eccentrically with respect to a central axis of the piston.

The drivetrain may include a sleeve coupled to the rotor to rotate together, and including an accommodating space thereinside and a first screw thread provided on an inner circumferential surface thereof; and a screw shaft provided in the accommodating space, and including a second screw thread meshing with the first screw thread on an outer circumferential surface thereof to convert a rotational motion of the sleeve into a linear motion; wherein the central axis of the piston is arranged eccentrically with respect to a central axis of the screw shaft.

One side of the screw shaft may be provided with the second screw thread, and the other side of the screw shaft may be coupled to the piston and is provided with an eccentric insertion portion for eccentrically coupled to the central axis of the piston.

The eccentric insertion portion may include a head protruding through one side of the piston, and a fixing member interposed between the head and the piston.

The eccentric insertion portion may include a slot recessed along a circumferential direction, and a tolerance ring inserted into the slot, the tolerance ring allows a relative rotational motion with respect to the screw shaft if a torque greater than an allowable value is applied to the screw shaft.

The piston may further include at least one piston sealing member fitted to an outer circumferential surface of the piston to seal the space between the modulator block and the piston, and a bush member interposed between the modulator block and the piston for stable linear motion of the piston.

The drivetrain may include a sleeve coupled to the rotor to rotate together, and including an accommodating space therein; and a screw shaft provided in the accommodation space; wherein one side of the screw shaft is coupled to the sleeve to rotate together with the sleeve, and an outer circumferential surface of the screw shaft is provided with a first screw thread to rotate relatively with respect to the piston.

The piston may include a first piston provided with a second screw thread meshing with the first screw thread inside thereof to convert a rotational motion of the screw shaft into a linear motion; and a second piston coupled to an end of the first piston to linearly move together with the first piston; wherein a central axis of the second piston is arranged eccentrically with respect to a central axis of the screw shaft.

The first piston may be provided with a coupling groove recessed in a longitudinal direction at an end thereof, and the second piston may be provided with a coupling protrusion protruding to correspond to the coupling groove and press-fitted to the first piston.

The hydraulic supply apparatus may further include a binding member passing through the second piston to be fastened to the first piston so that the first piston and the second piston are bound.

The second piston may include a head portion for applying and releasing the pressure of the fluid in the hydraulic chamber; and a receiving portion extending from the head portion to surround at least a part of an outer circumferential surface of the first piston.

The second piston may further include at least one piston sealing member fitted to an outer circumferential surface of the second piston to seal the space between the modulator block and the second piston, and a bush member interposed between the modulator block and the second piston for stable linear motion of the second piston.

The hydraulic supply apparatus may further include a motor housing coupled to the modulator block and surrounding the motor; and a pump housing coupled to the modulator block opposite the motor housing and forming the hydraulic chamber in which the piston linearly reciprocates.

In accordance with another aspect of the disclosure, a hydraulic supply apparatus may include a motor coupled to a modulator block including flow paths and valves for adjusting brake hydraulic pressure therein, the motor having a stator and a rotor; a sleeve coupled to the rotor to rotate together, and including an accommodating space thereinside and a first screw thread provided on an inner circumferential surface thereof; a screw shaft provided in the accommodating space, and including a second screw thread meshing with the first screw thread on an outer circumferential surface thereof to convert a rotational motion of the sleeve into a linear motion; a piston including a hollow portion and connected to an end of the screw shaft; a pump housing including a hydraulic chamber in which the piston is movable forward and backward; and an eccentric shaft provided inside the hydraulic chamber and fixedly installed in the pump housing to be eccentric with respect to an central axis of the piston; wherein the hollow portion comprises an eccentric groove formed to be recessed along a reciprocating direction of the piston at one side of an inner circumferential surface and accommodating at least a part of the eccentric shaft.

The eccentric shaft may include a guide shaft having one end coupled to the pump housing; and a bush coupled to the other end of the guide shaft and accommodated in the eccentric groove.

The screw shaft may be provided with a screw thread on one side thereof and a concentric insertion portion coaxially coupled to the piston on the other side thereof.

The concentric insertion portion may include a head protruding through one side of the piston; and a fixing member interposed between the head and the piston.

The concentric insertion portion may include a slot recessed along a circumferential direction thereof, and a tolerance ring inserted into the slot, the tolerance ring allows a relative rotational motion with respect to the screw shaft if a torque greater than an allowable value is applied to the screw shaft.

One end of the guide shaft may be serrated and press-fitted to the pump housing.

Advantageous Effects

The hydraulic supply apparatus according to an embodiment of the disclosure may improve assembly and productivity.

Further, the hydraulic supply apparatus according to an embodiment of the disclosure may simplify a structure and lighten a weight.

Further, the hydraulic supply apparatus according to an embodiment of the disclosure may prevent a piston used in a ball-screw manner from rotating during operation.

Further, the hydraulic supply apparatus according to an embodiment of the disclosure may prevent a damage to parts even when a load greater than an allowable value is applied.

Further, the hydraulic supply apparatus according to an embodiment of the disclosure may reduce the number of parts to low a cost, and be advantageous for packaging by improving space utilization.

MODES OF THE DISCLOSURE

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
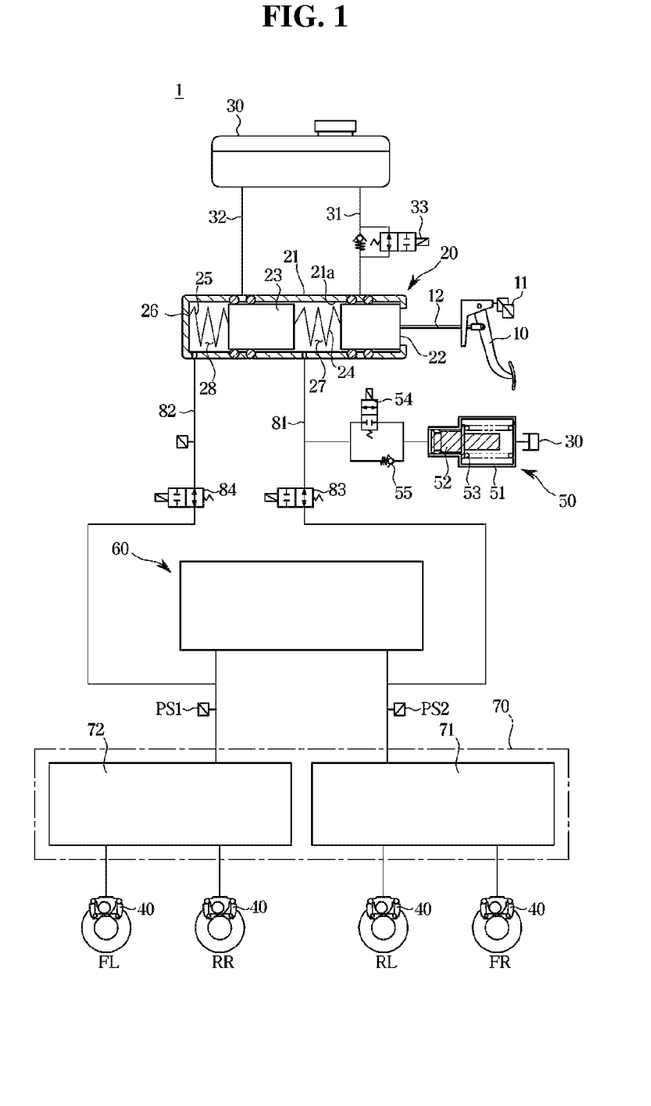
FIG. 1 is a view illustrating a non-braking state of a hydraulic circuit diagram of an electronic brake system according to an embodiment of the disclosure.

FIG. 1 is a view illustrating a non-braking state of a hydraulic circuit diagram of an electronic brake system.

Referring to FIG. 1, an electronic brake system 1 generally includes a master cylinder 20 generating hydraulic pressure, a reservoir 30 coupled to an upper side of the master cylinder 20 to store oil, and an input rod 12 for pressing the master cylinder 20 according to a pedal effort of a brake pedal 10, wheel cylinders 40 for braking each wheel RR, RL, FR, and FL by transmitting hydraulic pressure, and a pedal displacement sensor 11 for detecting displacement of the brake pedal 10, and a simulation device 50 for providing a reaction force according to the pedal effort of the brake pedal 10.

The master cylinder 20 is configured to have at least one chamber inside a cylinder body 21 to generate hydraulic pressure. For example, the master cylinder 20 includes first and second cylinder chambers 27 and 28 in a bore 21a formed in the cylinder body 21.

A first piston 22 connected to the input rod 12 is provided in the first cylinder chamber 27, and a second piston 23 is provided in the second cylinder chamber 28. Furthermore, the first cylinder chamber 27 is connected to a first back-up flow path 81 so that oil flows in and out, and the second cylinder chamber 28 communicates with a second back-up flow path 82 so that oil flows in and out.

A first spring 24 is provided between the first piston 22 and the second piston 23, and a second spring 25 is provided between the second piston 23 and a cap 26. In other words, the first piston 22 is accommodated in the first cylinder chamber 27, and the second piston 23 is accommodated in the second cylinder chamber 28.

The first spring 24 and the second spring 25 are compressed by the first and second pistons 22 and 23 that move as the displacement of the brake pedal 10 changes, resulting in storing elastic force. And when the force pushing the first piston 22 is smaller than the elastic force, the first and second pistons 22 and 23 are pushed back to their original state by using a restoring elastic force stored in the first and second spring 24 and 25.

The input rod 12 for pressing the first piston 22 of the master cylinder 20 is in close contact with the first piston 22. In other words, there is no gap between the master cylinder 20 and the input rod 12. Accordingly, when the brake pedal 10 is depressed, the master cylinder 20 is directly pressed without a pedal invalid stroke section. Furthermore, the first cylinder chamber 27 is connected to the reservoir 30 through a first reservoir flow path 31, and the second cylinder chamber 28 is connected to the reservoir 30 through a second reservoir flow path 32.

The simulation device 50 is connected to the first backup flow path 81 to be described later to provide a reaction force according to the pedal effort of the brake pedal 10. By providing a reaction force that compensates for the pedal effort provided by a driver, the driver may fine-tune braking force as intended. In other words, when the first piston 22 is pressed according to the pedal effort of the brake pedal 10, the hydraulic pressure discharged from the first cylinder chamber 27 is transmitted to the simulation device to provide a pedal feel to the driver. In this case, as the pressure of the first cylinder chamber 27 is diverted to the simulation device, the second piston 23 is not operated.

The simulation device 50 includes a simulation chamber 51 provided to store oil flowing out from the first cylinder chamber 27, a reaction force piston 52 provided in the simulation chamber 51, a reaction force spring 53 for elastically supporting the reaction force piston, and a simulator valve 54 connected to a front end of the simulation chamber 51. The reaction force piston 52 and the reaction force spring 53 are installed to have a displacement within a certain range in the simulation chamber 51 by the oil flowing into the simulation chamber 51.

On the other hand, the reaction force spring 53 shown in the drawings is merely an exemplary embodiment capable of providing an elastic force to the reaction force piston 52, and includes various embodiments capable of storing the elastic force by shape deformation. For example, the reaction force spring includes different elements capable of storing the elastic force by being provided with a material such as rubber, or having a coil or plate shape.

The simulator valve 54 is provided in a flow path connecting the first backup flow path 81 and the simulation chamber 51. Furthermore, the front end of the simulation chamber 51 is connected to the master cylinder 20 through the simulator valve 54 and the first backup flow path 81, and a rear end of the simulation chamber 51 is connected to the reservoir 30.

On the other hand, the simulator valve 54 is configured to a normal closed solenoid valve that maintains a normally closed state. The simulator valve 54 is opened when the driver applies a pedal force to the brake pedal 10 to transmit the oil in the simulation chamber 51 to the reservoir 30. Furthermore, when the reaction force piston 52 returns while the simulator valve 54 is opened, the oil in the reservoir 30 flows in the simulation chamber 51 and thus the entire interior thereof is filled with oil.

A check valve 55 is connected in parallel with the simulator valve 54. The simulator check valve 55 allows the oil in the simulation chamber 51 to flow into the first cylinder chamber 27, but block the oil in the first cylinder chamber 27 to flow into the simulation chamber 51 through a flow path in which the check valve 55 is installed. Therefore, because the oil in the simulation chamber 51 escapes through the simulator check valve 55 when the pedal effort of the brake pedal 10 is released, a quick return of the pressure of the simulation device is ensured.

An operation of the pedal simulation device 50 will be described. When the driver applies the pedal force to the brake pedal 10, the oil flowing in through the opened simulator valve 54 pressurizes the reaction force piston 52 of the simulation device, and the oil in the simulation chamber 51 in which the reaction force piston 52 pushes while compressing the reaction force spring 53 is transmitted to the reservoir 30. In this process, the driver is provided with the pedal feel.

Conversely, when the driver releases the pedal effort of the brake pedal 10, the reaction force piston 52 from which the pressure thereof is released returns to its original position by the elastic force of the reaction force spring 53, and the oil in the reservoir 30 flows into the simulation chamber 51 and thus the inside of thereof may be filled with the oil. Meanwhile, the oil filled in the front end of the reaction force piston 52 in the simulation chamber 51 returns to the master cylinder 20 through the flow path in which the simulator valve 54 is installed and the flow path in which the check valve 55 is installed.

As such, the inside of the simulation chamber 51 is always filled with the oil in a braking situation and a braking release situation, so the friction of the reaction force piston 52 is minimized when the simulation device 50 is operated. Accordingly, the durability of the simulation device 50 is improved, as well as the inflow of foreign substances from an outside is blocked.

On the other hand, a plurality of reservoirs 30 are shown in the drawings, and each of the reservoirs 30 is indicated the same reference numerals. However, the plurality of reservoirs may be provided with the same component or are provided with different components. For example, the reservoir 30 connected to the simulation device 50 may be the same as the reservoir 30 connected to the master cylinder 20, or may store oil separately from the reservoir 30 connected to the master cylinder 20.

Furthermore, the electronic brake system 1 includes a hydraulic supply apparatus 100 that receives a driver's braking intention as an electrical signal from the pedal displacement sensor 11 that detects the displacement of the brake pedal 10 to operate mechanically, a hydraulic control unit 70 including first and second hydraulic circuits 71 and 72 for controlling a flow of hydraulic pressure transmitted to the wheel cylinders 40 provided on two wheels RR, RL, FR, and FL, respectively, a first cut valve 83 provided in the first backup flow path 81 connecting the first cylinder chamber 27 and the first hydraulic circuit 71 to control the flow of hydraulic pressure, a second cut valve 84 provided in the second backup flow path 82 connecting the second cylinder chamber 28 and the second hydraulic circuit 72 to control the flow of hydraulic pressure, and an electronic control unit (ECU, not shown) that controls the hydraulic supply apparatus 100 and the valves based on hydraulic pressure information and pedal displacement information.

The hydraulic supply apparatus 100 provides oil pressure delivered to the wheel cylinders 40. The hydraulic supply apparatus 100 is provided in various ways. For example, a piston (not shown) moving by a driving force of a motor (not shown) pushes oil in the chamber to transmit hydraulic pressure to the wheel cylinders 40. Alternatively, the hydraulic supply apparatus 100 may be provided as a motor-driven pump or a high-pressure accumulator.

More specifically, when the driver depresses the brake pedal 10, as the displacement of the brake pedal 10 changes, an electrical signal is transmitted from the pedal displacement sensor 11, and the motor operates by the electrical signal. Furthermore, a drivetrain for converting a rotational motion of the motor into a linear motion is provided between the motor and the piston. The drivetrain includes a worm and a worm gear and/or a rack and pinion gear, and the like.

The hydraulic control unit 70 may include the first hydraulic circuit 71 and the second hydraulic circuit 72 that receive hydraulic pressure to control two wheels, respectively. For example, the first hydraulic circuit 71 controls a front right wheel FR and a rear left wheel RL, and the second hydraulic circuit 72 controls a front left wheel FL and a rear right wheel RR. Furthermore, the wheel cylinders 40 are installed on each of the wheels FR, FL, RR, and RL to receive hydraulic pressure to perform braking.

The hydraulic control unit 70 includes an inlet valve (not shown) provided at a front end of each wheel cylinder 40 to control hydraulic pressure, and an outlet valve (not shown) branched between the inlet valve and the wheel cylinders 40 and connected to the reservoir 30. Meanwhile, PS1 and PS2, which are not described, are backup flow path pressure sensors that measure the oil pressure of the master cylinder 20.

In a braking operation of the electronic brake system 1 as described above, in the case of a normal braking, the hydraulic supply apparatus 100 is operated by an electrical signal by detecting the displacement of the pedal according to the pedal effort of the brake pedal 10. The hydraulic pressure generated in the hydraulic supply apparatus 100 by the pedal effort of the brake pedal 10 is transmitted to each of the wheel cylinders 40 through the hydraulic control unit 70. In this case, the cut valves 83 and 84 provided in the backup flow paths 81 and 82 connecting the master cylinder 20 and the wheel cylinders 40 are switched to a closed state, resulting in blocking the hydraulic pressure is transmitted to the wheel cylinders 40.

Figure 2:
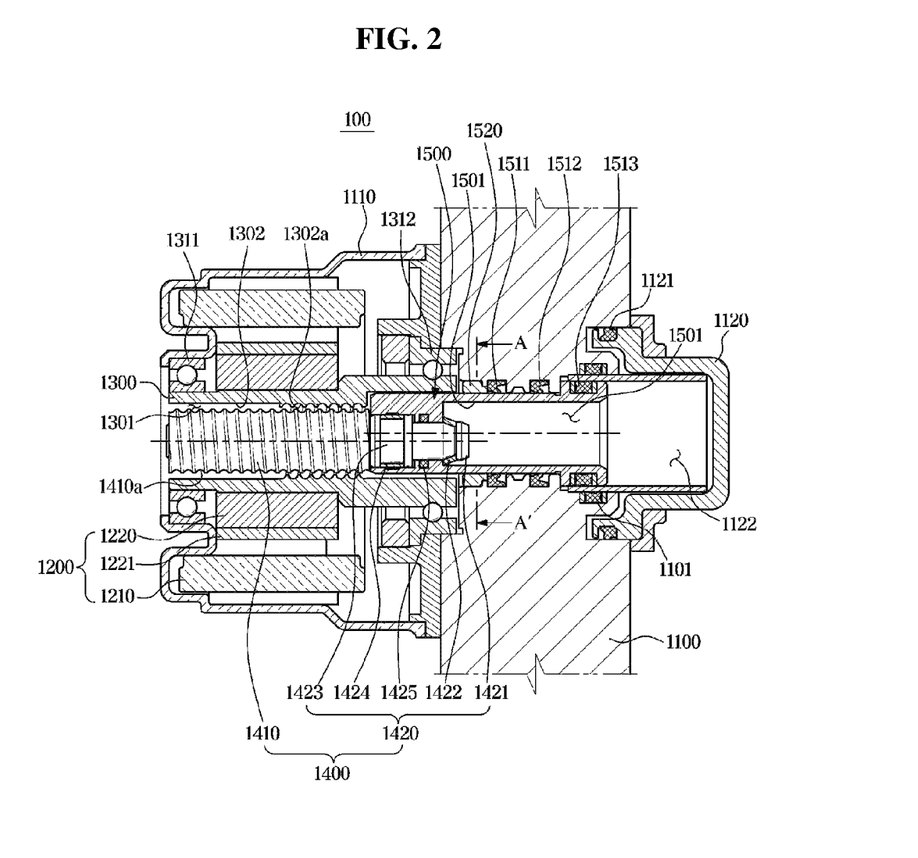
FIG. 2 is a cross-sectional view illustrating a hydraulic supply apparatus according to a first embodiment of the disclosure.
Figure 3:
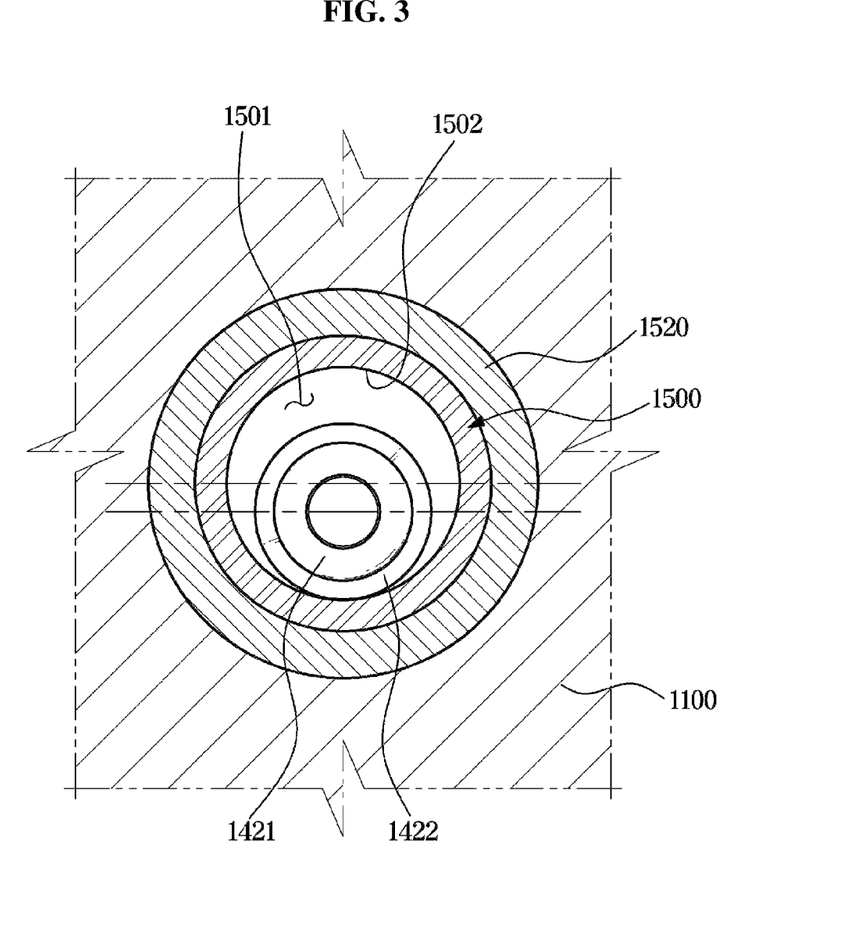
FIG. 3 is a cross-sectional view taken along line A-A' of FIG. 2.

FIG. 2 is a cross-sectional view illustrating a hydraulic supply apparatus according to a first embodiment of the disclosure, and FIG. 3 is a cross-sectional view taken along line A-A' of FIG. 2.

FIGS. 2 and 3, the hydraulic supply apparatus 100 according to the first embodiment of the disclosure includes a motor 1200 that is coupled to a modulator block 1100 having flow paths and valves for adjusting braking hydraulic pressure therein and has a stator 1210 and a rotor 1220, a sleeve 1300 that is coupled to the rotor 1220 to rotate together, and has an accommodating space 1301 thereinside and a first screw thread 1302a on an inner circumferential surface 1302 thereof, a screw shaft 1400 that is provided in the accommodating space 1301 and has a second screw thread 1410a meshing with the first screw thread 1302a on an outer circumferential surface thereof, and converts a rotational motion of the sleeve 1300 into a linear motion, and a piston 1500 connected to an end of the screw shaft 1400. A central axis of the piston 1500 is arranged eccentrically with respect to a central axis of the screw shaft 1400.

The modulator block 1100 is a housing for realizing a brake system by adjusting the braking hydraulic pressure. The modulator block 1100 may include a plurality of solenoid valves (not shown), an accumulator for temporarily storing oil discharged from the wheel cylinders, and the ECU for controlling the driving of the solenoid valves and the motor.

A motor housing 1110 and a pump housing 1120 may be respectively fastened to both sides of the modulator block 1100. The motor housing 1110 is fastened to a left side of the modulator block 1100 based on the drawings, and is provided to surround the motor 1200 to be described later. Furthermore, the pump housing 1120 is fastened to a right side of the modulator block 1100 based on the drawings, and forms a hollow hydraulic chamber 1122 in which the piston 1500 moves forward and backward. At this time, a working fluid flows into the hydraulic chamber 1122, and a pump sealing member 1121 for preventing the working fluid from flowing out is provided on one side of an outer surface of the pump housing 1120.

The motor 1200 generates a rotational force when power is supplied. The motor 1200 includes the stator 1210 that is supplied with power to form a magnetic field, and the rotor 1220 that rotates by a change in the magnetic field. The rotor 1220 is spaced apart from the inside of the stator 1210. A magnetic body 1221 is an element for generating a rotational force in the rotor 1220, and a plurality thereof are installed on an outer surface of the rotor 1220, and in this case, a certain gap is formed between the magnetic body 1221 and the stator 1210 in order to rotate without interference.

The drivetrain converts the rotational motion of the motor 1200 into the linear motion to pressurize the piston 1500 and release the pressure of the piston 1500. At this time, the central axis of the drivetrain is arranged eccentrically with respect to the central axis of the piston 1500 to prevent rotation of the piston 1500. Specifically, the drivetrain may include the sleeve 1300 that rotates together with the rotor 1220, and the screw shaft 1400 that converts the rotational motion of the sleeve 1300 into the linear motion.

The sleeve 1300 rotates together with the rotor 1220, and has the accommodating space 1301 thereinside and the first screw thread 1302a provided on the inner circumferential surface 1302 thereof. The sleeve 1300 is coupled to the inside of the rotor 1220 to rotate together, and has a first bearing 1311 and a second bearing 1312 provided at opposite ends thereof, respectively, so that the sleeve 1300 may be supported stably rotatable inside the motor housing 1110. At this time, the second bearing 1312 may be provided as a nut bearing in which an inner surface of the bearing is provided as one surface of the sleeve 1300.

The sleeve 1300 is provided with the accommodating space 1301 thereinside to accommodate the screw shaft 1400 and the piston 1500. Accordingly, the piston 1500 side end of the sleeve 1300 may be formed with a larger diameter. In this case, as shown in FIG. 2, the accommodating space on the piston 1500 side of the sleeve 1300 is also formed eccentrically so that the central axis of the piston 1500 is arranged eccentrically with respect to the central axis of the screw shaft 1400.

At least a part of the inner circumferential surface 1302 of the sleeve 1300 is provided with the first screw thread 1302a to be engaged with the second screw thread 1410a of the screw shaft 1400. Furthermore, the sleeve 1300 and the screw shaft 1400 may be coupled in a ball-screw manner, and a plurality of balls are provided between the first screw thread 1302a and the second screw thread 1410a to reduce energy due to friction.

The screw shaft 1400 is provided in the accommodating space 1301, and has the second screw thread 1410a meshing with the first screw thread 1302a on the outer circumferential surface thereof to convert the rotational motion of the sleeve 1300 into the linear motion. In particular, the screw shaft 1400 may include a screw portion 1410 having the second screw thread 1410a on one side thereof, and an eccentric insertion portion 1420 having the piston 1500 coupled on the other side thereof but eccentrically coupled to the central axis of the piston 1500.

The eccentric insertion portion 1420 is eccentrically inserted into the piston 1500 to prevent the screw shaft 1400 from rotating. In particular, the eccentric insertion portion 1420 may include a head 1421 passing and protruding through one side of the piston 1500, and a fixing member 1422 provided to surround a recess formed along a circumferential direction under the head 1421, and interposed between the head 1421 and the piston 1500.

At this time, the fixing member 1422 serves to couple the screw shaft 1400 and the piston 1500 due to the eccentric shaft 1420 being inserted into the piston 1500, but if a torque greater than an allowable value is applied to the screw shaft 1400, the fixing member allows a relative rotational motion with respect to the screw shaft 1400. In other words, if a load strongly acts on the screw shaft, it causes a damage and failure of the screw shaft 1400 and the piston 1500. Accordingly, the fixing member 1422 serves to allow rotation of the screw shaft 1400 when a torque greater than the allowable value is applied.

The eccentric insertion portion 1420 may include a slot 1423 recessed along the circumferential direction, and a tolerance ring 1424 inserted into the slot 1423. In particular, the eccentric insertion portion 1420 may include at least one slot 1423 recessed along the circumferential direction in a portion thereof inserted into the piston 1500, and the tolerance ring 1424 inserted into the slot 1423 to prevent tolerances occurring when the eccentric insertion portion 1420 is press-fitted to the piston 1500. The tolerance ring 1424 may be provided in a ring shape by winding a plate-shaped element around the slot 1423, and may absorb the tolerance by elastic force and prevent collision.

At this time, the tolerance ring 1424 serves to couple the screw shaft 1400 and the piston 1500 due to the eccentric insertion portion 1420 being inserted into the piston 1500, but if a torque greater than an allowable value is applied to the screw shaft 1400, the tolerance ring allows a relative rotational motion with respect to the screw shaft 1400. In other words, if a load strongly acts on the screw shaft, it causes a damage and failure of the screw shaft 1400 and the piston 1500. Accordingly, the tolerance ring 1424 serves to allow rotation of the screw shaft 1400 when a torque greater than the allowable value is applied.

The eccentric insertion portion 1420 may include at least one sealing member 1425 on an outer surface coupled to the piston 1500 to prevent an outflow of the working fluid and maintain airtightness.

The piston 1500 is inserted into a hole formed in the modulator block 1100, and is provided with a structure in which movement is restricted by being the head caught by the modulator block 100 when moving backward.

The piston 1500 may be connected to an end of the screw shaft 1400. As described above, the eccentric insertion portion 1420 located at the end of the screw shaft 1400 is inserted into and coupled to the piston 1500, and at this time, the central axis of the piston 1500 is arranged eccentrically with respect to the central axis of the screw shaft 1400 to prevent the rotation of the piston 1500 and the screw shaft 1400.

A hydraulic chamber 1122 is provided in front of the piston 1500 to form hydraulic pressure in the working fluid accommodated in the hydraulic chamber 1122 when the piston 1500 moves forward. The working fluid accommodated in the hydraulic chamber 1122 flows in and out toward the modulator block 1100 through the flow paths. Meanwhile, when the piston 1500 is advanced, another hydraulic chamber forming a closed space by the piston 1500, the modulator block 1100, and the pump housing 1120 may be provided at a rear thereof. In other words, a front hydraulic chamber and a rear hydraulic chamber are respectively formed in front and rear of the piston 1500 based on the drawings, and when the piston 1500 moves forward, hydraulic pressure may be formed through the front hydraulic chamber, and when the piston 1500 moves backward, hydraulic pressure may be formed through the rear hydraulic chamber. At this time, at least one piston sealing members 1511 and 1512 may be provided on an outer circumferential surface of the piston 1500 to seal the space between the modulator block 1100 and the piston 1500.

A bush member 1520 may be interposed between the modulator block 1100 and the piston 1500 for a stable forward and backward movement of the piston 1500. Furthermore, the bush member 1520 is made of a plastic material to protect the piston sealing member 1511 from protruding outward, to prevent vibration of the piston 1500 during the forward and backward movement of the piston 1500, and to prevent deterioration of the sealing performance of the piston sealing member 1511 by reducing abrasion of the piston sealing member 1511.

Figure 4:
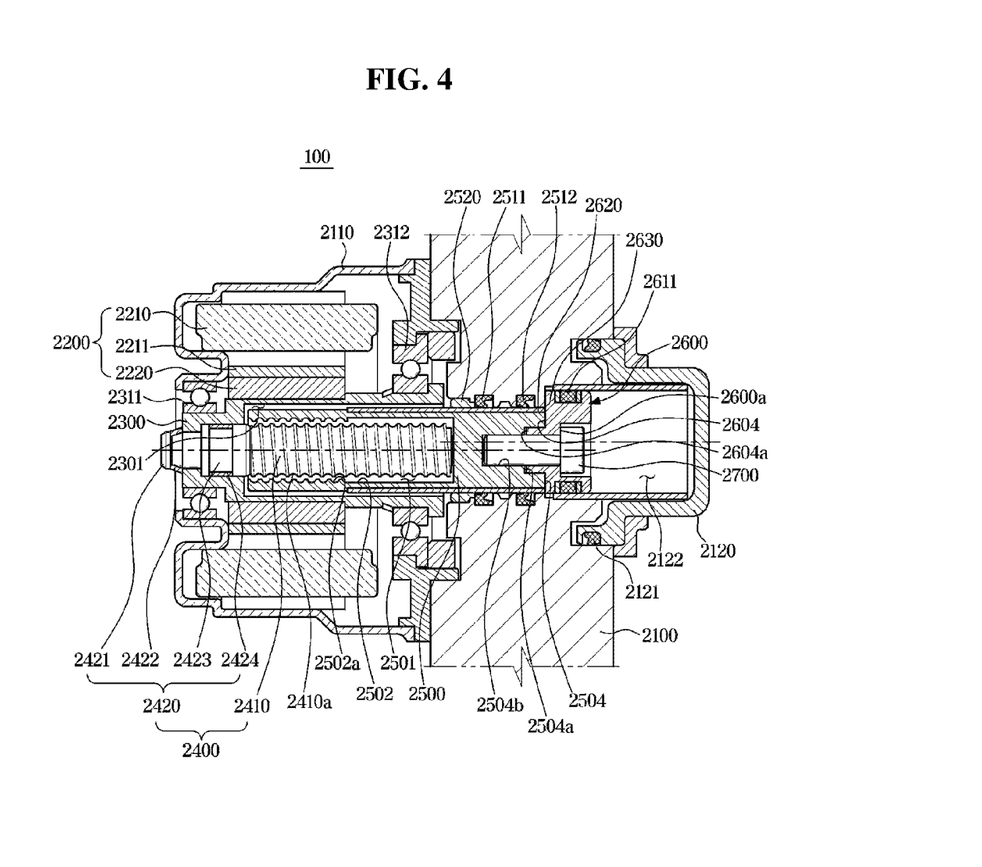
FIG. 4 is a cross-sectional view illustrating a hydraulic supply apparatus according to a second embodiment of the disclosure.
Figure 5:
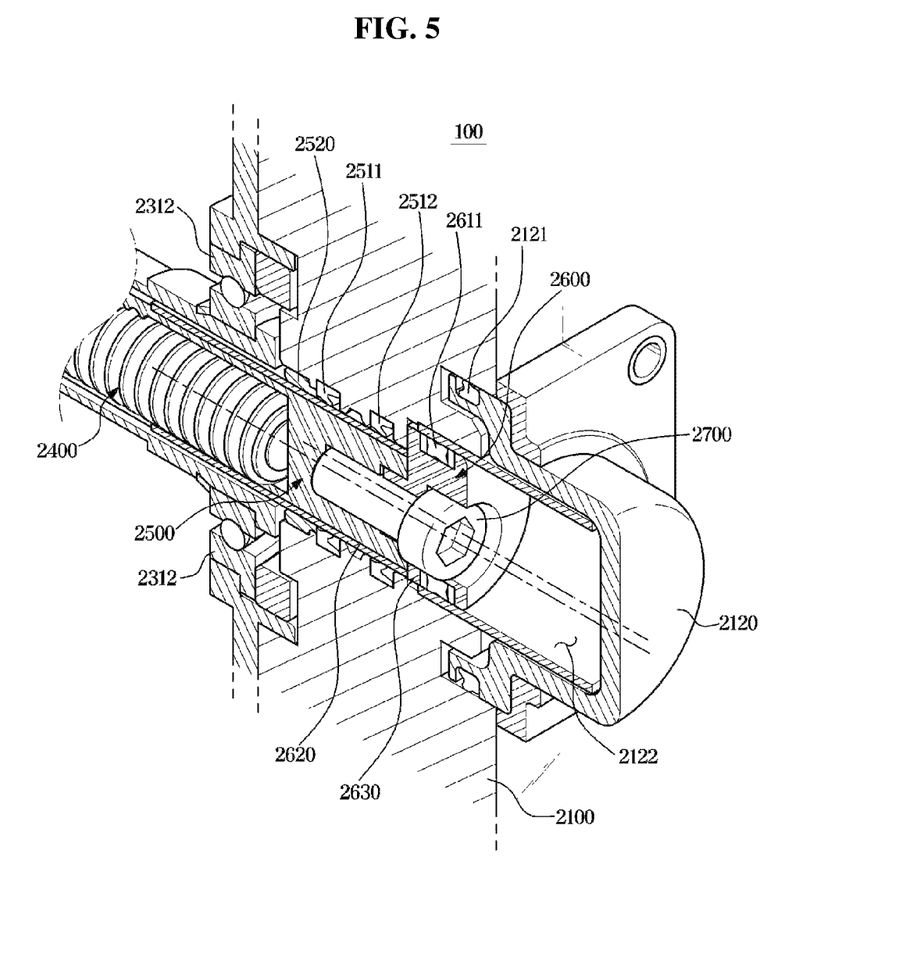
FIG. 5 is a perspective view illustrating a cross section of the hydraulic supply apparatus according to the second embodiment of the disclosure.

FIG. 4 is a cross-sectional view illustrating a hydraulic supply apparatus according to a second embodiment of the disclosure, and FIG. 5 is a perspective view showing a cross-section of the hydraulic supply apparatus according to the second embodiment of the disclosure.

Referring to FIGS. 4 and 5, the hydraulic supply apparatus 100 according to the second embodiment of the disclosure includes a motor 2200 that is coupled to a modulator block 2100 having flow paths and valves for adjusting braking hydraulic pressure therein and has a stator 2210 and a rotor 2220, a sleeve 2300 that is coupled to the rotor 2220 to rotate together and has an accommodating space 2301 thereinside, a screw shaft 2400 in which one side thereof is coupled to the sleeve 2300 to rotate together with the sleeve 2300 and a first screw thread 2410a is provided on an outer circumferential surface thereof, a first piston 2500 provided with a second screw thread 2502a meshing with the first screw thread 2410a on an inside thereof to convert a rotational motion of the screw shaft 2400 into a linear motion, and a second piston 2600 coupled to an end of the first piston 2500 and linearly moving together with the first piston 2500, wherein a central axis of the second piston 2600 is arranged eccentrically with respect to a central axis of the screw shaft 2400.

The modulator block 2100 is a housing for realizing a brake system by adjusting the braking hydraulic pressure. The modulator block 2100 may include a plurality of solenoid valves (not shown), an accumulator for temporarily storing oil discharged from the wheel cylinder, and the ECU for controlling the driving of the solenoid valves and the motor.

A motor housing 2110 and a pump housing 2120 may be fastened to both sides of the modulator block 2100, respectively. The motor housing 2110 is fastened to a left side of the modulator block 2100 based on the drawings, and is provided to surround the motor 2200 to be described later. Furthermore, the pump housing 2120 is fastened to a right side of the modulator block 2100 based on the drawings, and forms a hollow hydraulic chamber 2122 in which the second piston 2600 moves forward and backward. At this time, a working fluid flows into the hydraulic chamber 2122, and a pump sealing member 2121 for preventing the working fluid from flowing out is provided on one side of an outer surface of the pump housing 2120.

The motor 2200 generates a rotational force when power is supplied. The motor 2200 includes the stator 2210 that is supplied with power to form a magnetic field and the rotor 2220 that rotates by a change in the magnetic field. The rotor 2220 is spaced apart from the inside of the stator 2210. A magnetic body 2221 is an element for generating a rotational force in the rotor 2220, and a plurality thereof are installed on an outer surface of the rotor 2220, and at this time, a certain gap is formed between the magnetic body 2221 and the stator 2210 in order to rotate without interference.

The drivetrain converts the rotational motion of the motor 2200 into the linear motion to pressurize the pistons 2500 and 2600 and release the pressure of the pistons 2500 and 2600. At this time, the central axis of the drivetrain is arranged eccentrically with respect to the central axis of the pistons 2500 and 2600 to prevent rotation of the pistons 2500 and 2600. Specifically, the drivetrain may include the sleeve 2300 that rotates together with the rotor 2220, and the screw shaft 2400 that converts the rotational motion of the sleeve 2300 into the linear motion.

The sleeve 2300 rotates together with the rotor 2220, and has the accommodating space 2301 thereinside. The sleeve 2300 is coupled to the inside of the rotor 2220 to rotate together, and has a first bearing 2311 and a second bearing 2312 provided at opposite ends thereof, respectively, so that the sleeve 2300 may be supported stably rotatable inside the motor housing 2110.

The screw shaft 2400 is provided in the accommodating space 2301, and one side thereof is coupled to the sleeve 2300 to rotate together with the sleeve 2300, and the first screw thread 2410a is provided on an outer circumferential surface thereof. In particular, one end of the screw shaft 2400 is press-fitted to the sleeve 2300 to rotate together with the sleeve 2300, and the other end thereof is located in the accommodating space 2301, and the first screw thread 2410a provided on the outer circumferential surface thereof. The first screw thread 2410a of the screw shaft 2400 is engaged with the second screw thread 2502a of the first piston 2500, so the screw shaft 2400 may move the pistons 2500 and 2600 forward and backward.

The screw shaft 2400 may include a head 2421 passing and protruding through one side of the sleeve 2300, and a fixing member 2422 provided to surround a recess formed along a circumferential direction under the head 2421, and interposed between the head 2421 and the sleeve 2300.

At this time, the fixing member 2422 serves to couple the screw shaft 2400 and the sleeve 2300 due to the screw shaft 2400 being inserted into the sleeve 2300, but if a torque greater than an allowable value is applied to the screw shaft 2400, the fixing member allows a relative rotational motion with respect to the screw shaft 2400. In other words, if a load strongly acts on the screw shaft, it causes a damage and failure of the screw shaft 2400. Accordingly, the fixing member 2422 serves to allow rotation of the screw shaft 2400 when a torque greater than the allowable value is applied.

The screw shaft 2400 may include a slot 2423 recessed along the circumferential direction, and a tolerance ring 2424 inserted into the slot 2423. More specifically, the screw shaft 2400 may include at least one slot 2423 recessed along the circumferential direction in a portion thereof inserted into the sleeve 2300, and the screw shaft 2400 inserted into the sleeve 2300 to prevent tolerances occurring when the screw shaft 2400 is press-fitted to the sleeve 2300. The tolerance ring 2424 may be provided in a ring shape by winding a plate-shaped member around the slot 2423, and may absorb the tolerance by the elastic force and prevent collision.

At this time, the tolerance ring 2424 serves to couple the screw shaft 2400 and the sleeve 2300 due to the screw shaft 2400 being inserted into the sleeve 2300, but if a torque greater than an allowable value is applied to the screw shaft 2400, the tolerance ring allows a relative rotational motion with respect to the screw shaft 2400. In other words, if a load strongly acts on the screw shaft 2400, it causes a damage and failure of the screw shaft 2400. Accordingly, the tolerance ring 2424 serves to allow rotation of the screw shaft 2400 when a torque greater than the allowable value is applied.

The pistons include the first piston 2500 and the second piston 2600.

The first piston 2500 may be provided with the second screw thread 2502a meshing with the first screw thread 2410a on the inside thereof to convert the rotational motion of the screw shaft 2400 into the linear motion. The first piston 2500 may be provided with a screw accommodating space 2501 toward the screw shaft 2400 to accommodate the screw shaft 2400, and at least a part of the inner circumferential surface 2502 thereof is provided with a second screw thread 2502a to be engaged with the first screw thread 2410a. Furthermore, the first piston 2500 and the screw shaft 2400 may be coupled in a ball-screw manner, and a plurality of balls are provided between the first screw thread 2410*a* and the second screw thread 2502*a* to reduce energy due to friction.

The first piston 2500 is coupled to the second piston 2600 to linearly move together. In particular, the first piston 2500 may be coupled stably the second piston 2600 to be described later by being surrounded by a receiving portion 2620 extending from a head portion 2630 of the second piston 2600 toward the first piston 2500.

The first piston 2500 is provided with a coupling groove 2504*a* recessed in a longitudinal direction at the end thereof, and the second piston 2600 is provided with a coupling protrusion 2604*a* protruding to correspond to the coupling groove 2504*a*, so that the second piston 2600 is press-fitted to the first piston 2500. Furthermore, a binding member may pass through the second piston 2600 and be fastened to the first piston 2500 to bind the first piston 2500 and the second piston 2600, and particularly a portion provided a coupling protrusion 2604*a* may be vertically penetrated to coupling surfaces 2504 and 2604 and be coupled to the coupling groove 2504*b*.

The second piston 2600 may be coupled to an end of the first piston 2500 and linearly move together with the first piston 2500 to pressurize and release the pressure of the fluid. In particular, the second piston 2600 includes the head portion 2630 that pressurizes and release the pressure of the fluid inside the cylinder, and the receiving part 2620 extending from the head portion 2630 and surrounds at least a part of the outer circumferential surface of the first piston 2500. Accordingly, as described above, the second piston 2600 may be coupled to the end of the first piston 2500 to linearly move together.

The central axis of the second piston 2600 is arranged eccentrically with respect to the central axis of the screw shaft 2400 to prevent the second piston 2600 and the first piston 2500 from rotating. Furthermore, the central axis of the second piston 2600 is arranged eccentrically with respect to the central axis of the first piston 2500 to prevent the second piston 2600 and the first piston 2500 from rotating. As shown in FIGS. 4 and 5, the diameter of the head portion 2630 of the second piston 2600 is formed to be larger than that of the first piston 2500, and the central axis of the head portion 2630 is arranged eccentrically with respect to the central axis of the screw shaft 2400. Accordingly, the rotation of the first piston 2500 bound to the second piston 2600 is also prevented, and thus the rotational motion of the screw shaft 2400 is converted into the linear motion.

The first and second pistons 2500 and 2600 are inserted into a hole formed in the modulator block 1100, and are provided with a structure in which movement is restricted by being the head portion caught by the modulator block 100 when moving backward.

A hydraulic chamber 2122 is provided in front of the first and second pistons 2500 and 2600 to form hydraulic pressure in the working fluid accommodated in the hydraulic chamber 2122 when the first and second pistons 2500 and 2600 are advanced. The working fluid accommodated in the hydraulic chamber 2122 flows in and out toward the modulator block 1100 through the flow paths. Meanwhile, when the first and second pistons 2500 and 2600 are advanced, another hydraulic chamber forming a closed space by the first and second pistons 2500 and 2600, the modulator block 1100 and the pump housing 1120 may be provided at a rear thereof. In other words, based on the drawings, a front hydraulic chamber and a rear hydraulic chamber are respectively formed in front and rear of the first and second pistons 2500 and 2600, and when the first and second pistons 2500 and 2600 are advanced, hydraulic pressure may be formed through the front hydraulic chamber, and when moving backward, hydraulic pressure may be formed through the rear hydraulic chamber. At this time, at least one piston sealing members 2511 and 2512 may be provided on an outer circumferential surface of the second piston 2600 to seal the space between the modulator block 1100 and the second piston 2600.

A bush member 2520 may be interposed between the modulator block 1100 and the second piston 2600 for stable forward and backward movement of the first and second pistons 2500 and 2600. Furthermore, the bush member 2520 is made of a plastic material to protect the piston sealing member 2511 from protruding outward, and prevent vibration of the first and second pistons 2500 and 2600 during the forward and backward movement of the first and second pistons 2500 and 2600, and to prevent deterioration of the sealing performance of the piston sealing member 2511 by reducing abrasion of the piston sealing member 2511.

Figure 6:
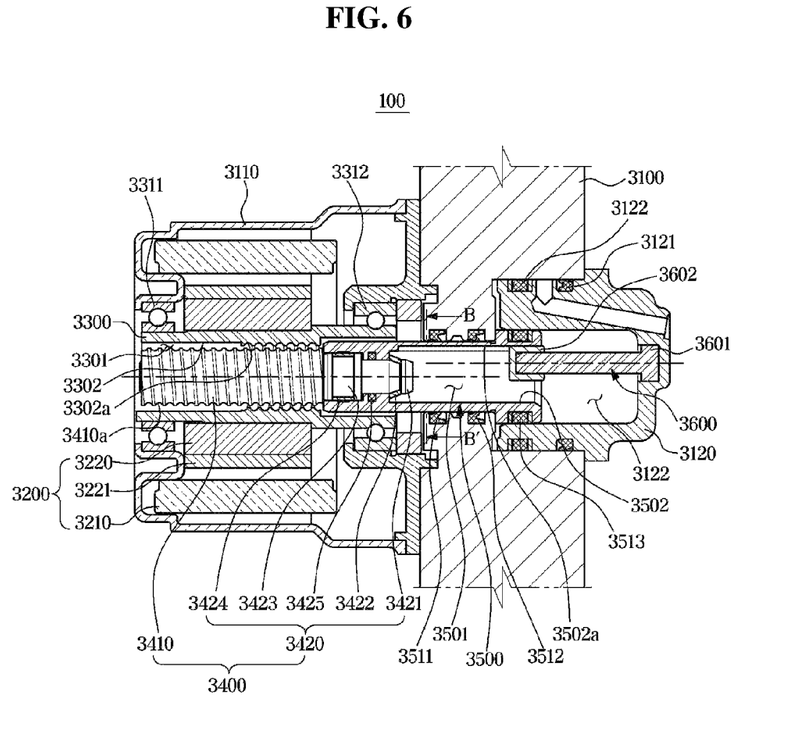
FIG. 6 is a cross-sectional view illustrating a hydraulic supply apparatus according to a third embodiment of the disclosure.
Figure 7:
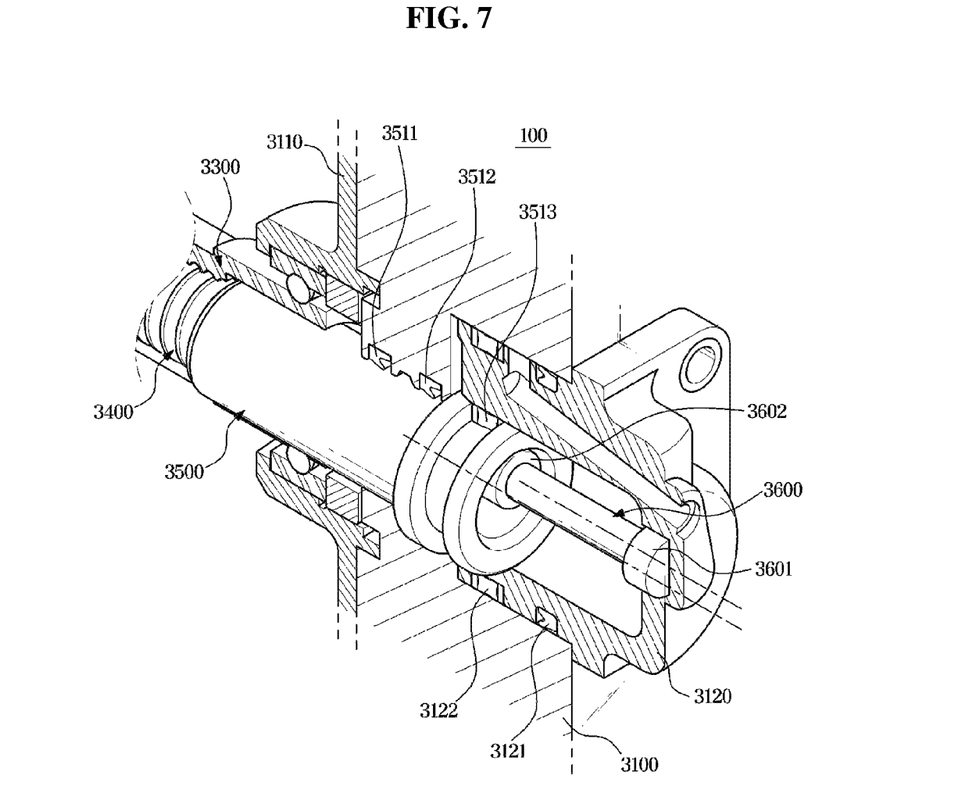
FIG. 7 is a perspective view illustrating a cross section of the hydraulic supply apparatus according to the third embodiment of the disclosure.
Figure 8:
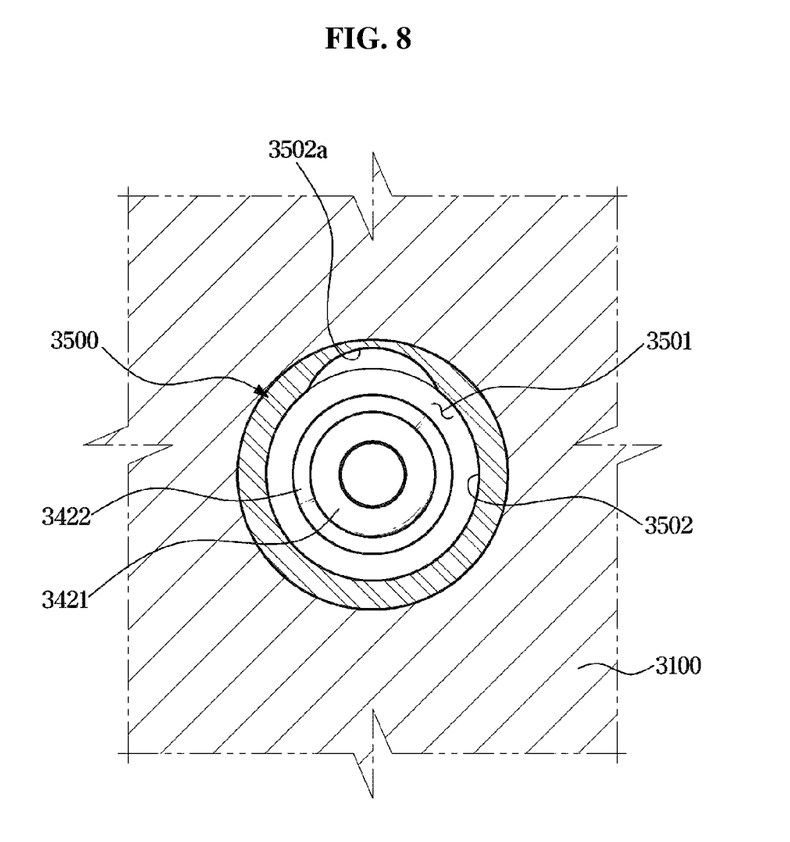
FIG. 8 is a cross-sectional view taken along line B-B' of FIG. 5.

FIG. 6 is a cross-sectional view illustrating a hydraulic supply apparatus according to a third embodiment of the disclosure, FIG. 7 is a perspective view showing a cross-section of the hydraulic supply apparatus according to the third embodiment of the disclosure, and FIG. 8 is a cross-sectional view taken along line B-B' of FIG. 5.

Referring to FIGS. 6 to 8, the hydraulic supply apparatus 100 according to the third embodiment of the disclosure a motor that is coupled to a modulator block 1100 having flow paths and valves for adjusting braking hydraulic pressure therein and has a stator 3210 and a rotor 3220, a sleeve 3300 that is coupled to the rotor 3220 to rotate together, and has an accommodating space 3301 thereinside and a first screw thread 3302*a* on an inner circumferential surface 3302 thereof, a screw shaft 3400 that is provided in the accommodating space 3301 and has a second screw thread 3410*a* meshing with the first screw thread 3302*a* on an outer circumferential surface thereof and converts a rotational motion of the sleeve 3300 into a linear motion, a piston 3500 having a hollow portion 3511 and connected to an end of the screw shaft 4400, a pump housing 1120 having a hydraulic chamber 3122 in which the piston 3500 may move forward and backward inside the pump housing, and an eccentric shaft 3600 that is provided inside the hydraulic chamber 3122 and is fixedly installed in the pump housing 1120 eccentrically with respect to the central axis of the piston 3500.

The modulator block 3100 is a housing for realizing a brake system by adjusting the braking hydraulic pressure. The modulator block 3100 may include a plurality of solenoid valves (not shown), an accumulator for temporarily storing oil discharged from the wheel cylinders, and the ECU for controlling the driving of the solenoid valves and the motor.

A motor housing 3110 and a pump housing 3120 may be fastened to both sides of the modulator block 3100, respectively. The motor housing 3110 is fastened to a left side of the modulator block 3100 based on the drawings, and is provided to surround the motor 3200 to be described later. Furthermore, the pump housing 3120 is fastened to a right side of the modulator block 3100 based on the drawings, and forms the hollow hydraulic chamber 3122 in which the piston 3500 moves forward and backward. At this time, a working fluid flows into the hydraulic chamber 3122, and at least one pump sealing members 3121 and 3122 for preventing the working fluid from flowing out is provided on one side of an outer surface of the pump housing 3120. Details of the pump housing 3120 and the eccentric shaft 3600 will be described later.

The motor 3200 generates a rotational force when power is supplied. The motor 3200 includes the stator 3210 that is supplied with power to form a magnetic field, and the rotor 3220 that rotates by a change in the magnetic field. The rotor 3220 is spaced apart from the inside of the stator 3210. A magnetic body 3221 is an element for generating a rotational force in the rotor 3220, and a plurality thereof are installed on an outer surface of the rotor 3220 to rotate, and in this case, a certain gap is formed between the magnetic body 3221 and the stator 3210 in order to rotate without interference.

The sleeve 3300 rotates together with the rotor 3320, and has the accommodating space 3301 thereinside and the first screw thread 3302a provided on the inner circumferential surface thereof. The sleeve 3300 is coupled to the inside of the rotor 3320 to rotate together, and has a first bearing 3311 and a second bearing 3312 provided at opposite ends thereof, respectively, so that the sleeve may be supported stably rotatable inside the motor housing 3110. At this time, the second bearing 3312 may be provided as a nut bearing in which an inner surface of the bearing is provided as one surface of the sleeve 3300.

At least a part of the inner circumferential surface of the sleeve 3300 is provided with the first screw thread 3302a to be engaged with the second screw thread 3410a of the screw shaft 3400. Furthermore, the sleeve 3300 and the screw shaft 3400 may be coupled in a ball-screw manner, and a plurality of balls are provided between the first screw thread 3302a and the second screw thread 3410a to reduce energy due to friction.

The screw shaft 3400 is provided in the accommodating space 3301, and has the second screw thread 3410a meshing with the first screw thread 3302a on the outer peripheral surface thereof to convert the rotational motion of the sleeve 3300 into the linear motion. In particular, the screw shaft 3400 may include a screw portion 3410 having the second screw thread 3410a on one side thereof, and a concentric insertion portion 3420 having the piston 1500 coupled on the other side thereof but concentrically coupled to the central axis of the piston 3500.

The concentric insertion portion 3420 may include a head 3421 passing and protruding through on side of the piston 3500, and a fixing member 3422 provided to surround a recess formed along a circumferential direction under the head 3421, and interposed between the head 3421 and the piston 3500.

At this time, the fixing member 3422 serves to couple the screw shaft 3400 and the piston 3500 due to the concentric insertion portion 3420 being inserted into the piston 3500, but if a torque greater than an allowable value is applied to the screw shaft 3400, the fixing member allows a relative rotational motion with respect to the screw shaft 3400. In other words, if a load strongly acts on the screw shaft 3400, it causes a damage and failure of the screw shaft 3400 and the piston 3500. Accordingly, the fixing member 3422 serves to allow rotation of the screw shaft 3400 when a torque greater than the allowable value is applied.

The concentric insertion portion 3420 may include a slot 3423 recessed along the circumferential direction thereof, and a tolerance ring 3424 inserted into the slot 3423. In particular, the concentric insertion portion 3420 may include at least one slot 3423 recessed along the circumferential direction in a portion thereof inserted into the piston 3500, and the concentric insertion portion 3420 inserted into the piston 3500 to prevent tolerances occurring when the concentric insertion portion 3420 is press-fitted to the piston 3500. The tolerance ring 3424 may be provided in a ring shape by winding a plate-shaped member around the slot 3423, and may absorb the tolerance by the elastic force and prevent collision.

At this time, the tolerance ring 3424 serves to couple the screw shaft 3400 and the piston 3500 due to the concentric insertion portion 3420 being inserted into the piston 3500, but if a torque greater than an allowable value is applied to the screw shaft 3400, the tolerance ring allows a relative rotational motion with respect to the screw shaft 3400. In other words, if a load strongly acts on the screw shaft 3400, it causes a damage and failure of the screw shaft 3400 and the piston 3500. Accordingly, the tolerance ring 3424 serves to allow rotation of the screw shaft 3400 when a torque greater than the allowable value is applied.

The concentric insertion portion 3420 may include at least one sealing member 3425 on an outer surface coupled to the piston 3500 to prevent an outflow of the working fluid and maintain airtightness.

The piston 3500 is inserted into a hole formed in the modulator block 3100, and is provided with a structure in which movement is restricted by being the head caught by the modulator block 100 when moving backward.

A hydraulic chamber 3122 is provided in front of the piston 3500 to form hydraulic pressure in the working fluid accommodated in the hydraulic chamber 3122 when the piston 3500 moves forward. The working fluid accommodated in the hydraulic chamber 3122 flows in and out toward the modulator block 3100 through the flow paths. Meanwhile, when the piston 3500 is advanced, another hydraulic chamber forming a closed space by the piston 3500, the modulator block 3100, and the pump housing 3120 may be provided at a rear thereof. In other words, based on the drawings, a front hydraulic chamber and a rear hydraulic chamber are respectively formed in front and rear of the piston 1500, and when the piston 3500 moves forward, hydraulic pressure may be formed through the front hydraulic chamber, and when the piston 3500 moves backward, hydraulic pressure may be formed through the rear hydraulic chamber. At this time, at least one piston sealing members 3511 and 3512 may be provided on an outer circumferential surface of the piston 3500 to seal the space between the modulator block 3100 and the piston 3500.

The piston 3500 includes an eccentric groove 3502a that is recessed along a reciprocating direction of the piston 3500 at one side of an inner circumferential surface 3502 to accommodate at least a part of the eccentric shaft 3600. The eccentric groove 3502a may be formed in at least one or more if it is recessed in the inner circumferential surface 3502 of the piston 3500 in the reciprocating direction, and may be provided in different numbers and shapes.

The pump housing 3120 may be provided with the eccentric shaft 3600 fixedly installed eccentrically with respect to the central axis of the piston 3500 inside the hydraulic chamber 3122. The eccentric shaft 3600 is at least partially accommodated in the eccentric groove 3502a which is recessed along the reciprocating direction of the piston 3500 at one side of the inner circumferential surface 3502 of the piston, so that the forward and backward movement of the piston 3500 is allowed but the rotational movement of the piston 3500 is blocked. Furthermore, the eccentric shaft 3600 may be formed in plurality, and may be provided in the number and shape corresponding to the eccentric groove 3502a.

The eccentric shaft 3600 may include a guide shaft 3601 having one end coupled to the pump housing 3120, and a bush 3602 coupled to the other end of the guide shaft 3601 and accommodated in the eccentric groove 3502*a*. Furthermore, one end of the guide shaft 3601 may be press-fitted to the pump housing 3120 by being serrated.

As shown in the drawings, the guide shaft 3601 and the bush have a circular cross section, but are not limited thereto. In addition, the guide shaft 3601 and the bush have shapes corresponding to the eccentric groove 3502*a* and may have various modifications as long as rotation of the piston 3500 may be prevented, and it should be understood in the same way.

In the first to third embodiments of the disclosure described above, the hydraulic supply apparatus 100 supplies hydraulic pressure in a screw-nut method that converts a rotational motion into a linear motion, but may ensure the straightness of the piston by using a point where the central axes are eccentrically arranged without a separate anti-rotation portion.

Therefore, additional space and parts do not require, so there are effects of cost reduction and packaging performance improvement.

While the disclosure has been shown and described with reference to certain exemplary embodiments thereof, it will be understood by those skilled in the art that various changes in form and details may be made therein without departing from the spirit and scope of the disclosure as defined by the appended claims.

The invention claimed is:

1. A hydraulic supply apparatus, comprising:
a motor coupled to a modulator block including flow paths and valves for adjusting brake hydraulic pressure therein, the motor having a stator and a rotor;
a piston configured to move forward and backward in a hydraulic chamber to provide hydraulic pressure;
a drivetrain configured to convert a rotational motion of the motor into a linear motion to apply and release the pressure of the piston;
a motor housing coupled to the modulator block and surrounding the motor; and
a pump housing coupled to the modulator block opposite the motor housing and forming the hydraulic chamber in which the piston linearly reciprocates,
wherein a central axis of the drivetrain is arranged eccentrically with respect to a central axis of the piston.

2. The hydraulic supply apparatus of claim 1, wherein the drivetrain comprises:
a sleeve coupled to the rotor to rotate together, and including an accommodating space thereinside and a first screw thread provided on an inner circumferential surface thereof; and
a screw shaft provided in the accommodating space, and including a second screw thread meshing with the first screw thread on an outer circumferential surface thereof to convert a rotational motion of the sleeve into a linear motion;
wherein the central axis of the piston is arranged eccentrically with respect to a central axis of the screw shaft.

3. The hydraulic supply apparatus of claim 2, wherein one side of the screw shaft is provided with the second screw thread, and the other side of the screw shaft is coupled to the piston and is provided with an eccentric insertion portion for eccentrically coupled to the central axis of the piston.

4. The hydraulic supply apparatus of claim 3, wherein the eccentric insertion portion comprises a head protruding through one side of the piston, and a fixing member interposed between the head and the piston.

5. The hydraulic supply apparatus of claim 4, wherein
the eccentric insertion portion comprises a slot recessed along a circumferential direction, and a tolerance ring inserted into the slot,
the tolerance ring allows a relative rotational motion with respect to the screw shaft if a torque greater than an allowable value is applied to the screw shaft.

6. The hydraulic supply apparatus of claim 2, wherein the piston further comprises at least one piston sealing member fitted to an outer circumferential surface of the piston to seal the space between the modulator block and the piston, and a bush member interposed between the modulator block and the piston for stable linear motion of the piston.

7. A hydraulic supply apparatus, comprising:
a motor coupled to a modulator block including flow paths and valves for adjusting brake hydraulic pressure therein, the motor having a stator and a rotor;
a piston configured to move forward and backward in a hydraulic chamber to provide hydraulic pressure; and
a drivetrain configured to convert a rotational motion of the motor into a linear motion to apply and release the pressure of the piston,
wherein a central axis of the drivetrain is arranged eccentrically with respect to a central axis of the piston, and
wherein the drivetrain comprises:
a sleeve coupled to the rotor to rotate together, and including an accommodating space therein; and
a screw shaft provided in the accommodation space;
wherein one side of the screw shaft is coupled to the sleeve to rotate together with the sleeve, and an outer circumferential surface of the screw shaft is provided with a first screw thread to rotate relatively with respect to the piston.

8. The hydraulic supply apparatus of claim 7, wherein the piston comprises:
a first piston provided with a second screw thread meshing with the first screw thread inside thereof to convert a rotational motion of the screw shaft into a linear motion; and
a second piston coupled to an end of the first piston to linearly move together with the first piston;
wherein a central axis of the second piston is arranged eccentrically with respect to a central axis of the screw shaft.

9. The hydraulic supply apparatus of claim 8, wherein
the first piston is provided with a coupling groove recessed in a longitudinal direction at an end thereof, and
the second piston is provided with a coupling protrusion protruding to correspond to the coupling groove and press-fitted to the first piston.

10. The hydraulic supply apparatus of claim 9, further comprising:
a binding member passing through the second piston to be fastened to the first piston so that the first piston and the second piston are bound.

11. The hydraulic supply apparatus of claim 8, wherein the second piston comprises:
a head portion for applying and releasing the pressure of the fluid in the hydraulic chamber; and
a receiving portion extending from the head portion to surround at least a part of an outer circumferential surface of the first piston.

12. The hydraulic supply apparatus of claim 8, wherein the second piston further comprises at least one piston sealing member fitted to an outer circumferential surface of the second piston to seal the space between the modulator block and the second piston, and a bush member interposed between the modulator block and the second piston for stable linear motion of the second piston.

13. The hydraulic supply apparatus of claim 7, further comprising:
a motor housing coupled to the modulator block and surrounding the motor; and
a pump housing coupled to the modulator block opposite the motor housing and forming the hydraulic chamber in which the piston linearly reciprocates.

14. A hydraulic supply apparatus, comprising:
a motor coupled to a modulator block including flow paths and valves for adjusting brake hydraulic pressure therein, the motor having a stator and a rotor;
a sleeve coupled to the rotor to rotate together, and including an accommodating space thereinside and a first screw thread provided on an inner circumferential surface thereof;
a screw shaft provided in the accommodating space, and including a second screw thread meshing with the first screw thread on an outer circumferential surface thereof to convert a rotational motion of the sleeve into a linear motion;
a piston including a hollow portion and connected to an end of the screw shaft;
a pump housing including a hydraulic chamber in which the piston is movable forward and backward; and
an eccentric shaft provided inside the hydraulic chamber and fixedly installed in the pump housing to be eccentric with respect to a central axis of the piston;
wherein the hollow portion comprises an eccentric groove formed to be recessed along a reciprocating direction of the piston at one side of an inner circumferential surface and accommodating at least a part of the eccentric shaft.

15. The hydraulic supply apparatus of claim 14, wherein the eccentric shaft comprises:
a guide shaft having one end coupled to the pump housing; and
a bush coupled to the other end of the guide shaft and accommodated in the eccentric groove.

16. The hydraulic supply apparatus of claim 14, wherein the screw shaft is provided with a screw thread on one side thereof and a concentric insertion portion coaxially coupled to the piston on the other side thereof.

17. The hydraulic supply apparatus of claim 16, wherein the concentric insertion portion comprises a head protruding through one side of the piston; and a fixing member interposed between the head and the piston.

18. The hydraulic supply apparatus of claim 17, wherein the concentric insertion portion comprises a slot recessed along a circumferential direction thereof, and a tolerance ring inserted into the slot,
the tolerance ring allows a relative rotational motion with respect to the screw shaft if a torque greater than an allowable value is applied to the screw shaft.

19. The hydraulic supply apparatus of claim 15, wherein one end of the guide shaft is serrated and press-fitted to the pump housing.

* * * * *